US012576738B2

(12) United States Patent
Madden

(10) Patent No.: US 12,576,738 B2
(45) Date of Patent: Mar. 17, 2026

(54) DOCKED INTERLOCK SYSTEM AND METHOD

(71) Applicant: Universal City Studios LLC, Universal City, CA (US)

(72) Inventor: Joseph Daniel Madden, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 820 days.

(21) Appl. No.: 17/875,791

(22) Filed: Jul. 28, 2022

(65) Prior Publication Data

US 2023/0398891 A1 Dec. 14, 2023

Related U.S. Application Data

(60) Provisional application No. 63/352,052, filed on Jun. 14, 2022.

(51) Int. Cl.
*B60L 53/36* (2019.01)
*A63G 31/00* (2006.01)
*B60L 53/16* (2019.01)
*B60L 53/66* (2019.01)

(52) U.S. Cl.
CPC .............. *B60L 53/36* (2019.02); *B60L 53/16* (2019.02); *B60L 53/66* (2019.02); *A63G 31/00* (2013.01)

(58) Field of Classification Search
CPC .......... B60L 53/36; B60L 53/66; B60L 53/16; A63G 31/00
USPC ........................................................ 320/109
See application file for complete search history.

(56) References Cited

U.S. PATENT DOCUMENTS

| | | | | |
|---|---|---|---|---|
| 5,403,238 A | * | 4/1995 | Baxter | A63G 31/16 |
| | | | | 472/43 |
| 7,876,068 B2 | * | 1/2011 | Faunce | H02J 7/0049 |
| | | | | 320/132 |
| 8,242,627 B2 | * | 8/2012 | Ichikawa | B60L 55/00 |
| | | | | 180/65.265 |
| 8,278,573 B2 | | 10/2012 | Chuang | |
| 8,324,858 B2 | * | 12/2012 | Hill | B60L 5/005 |
| | | | | 180/312 |
| 8,764,469 B2 | | 7/2014 | Amb | |
| 9,368,959 B2 | | 6/2016 | Wright, Jr. et al. | |
| 10,046,661 B2 | | 8/2018 | DeDona et al. | |
| 10,173,543 B2 | | 1/2019 | Yang et al. | |
| 2003/0137275 A1 | * | 7/2003 | Suzuki | B60L 3/0046 |
| | | | | 320/104 |

(Continued)

FOREIGN PATENT DOCUMENTS

| | | | | | |
|---|---|---|---|---|---|
| CN | 104362698 A | * | 2/2015 | | H02J 7/0004 |
| EP | 4339011 A1 | * | 3/2024 | | B60L 53/16 |
| WO | WO-2023244442 A1 | * | 12/2023 | | B60L 53/14 |

OTHER PUBLICATIONS

PCT/US2023/024106 International Search Report and Written Opinion mailed Sep. 26, 2023.

*Primary Examiner* — Suresh Memula
(74) *Attorney, Agent, or Firm* — Fletcher Yoder, P.C.

(57) ABSTRACT

A charge interlock system of an electronic device includes a drive system, a relay coupled to the drive system, and a controller. The controller receives an indication that the electric device is in a charging mode. The controller also transmits signals to open the relay. Moreover, the controller determines that the drive system is disabled based at least in part on the open relay.

20 Claims, 3 Drawing Sheets

(56) References Cited

U.S. PATENT DOCUMENTS

| | | | | |
|---|---|---|---|---|
| 2004/0062059 A1* | 4/2004 | Cheng | ........................ | H02J 5/00 |
| | | | | 363/17 |
| 2010/0164287 A1* | 7/2010 | Komazawa | ............ | B60L 55/00 |
| | | | | 307/44 |
| 2011/0128153 A1* | 6/2011 | Sims | ........................ | G06F 1/325 |
| | | | | 307/66 |
| 2011/0260528 A1* | 10/2011 | Obayashi | ............... | B60L 53/14 |
| | | | | 320/137 |
| 2014/0077771 A1* | 3/2014 | Yamashita | ............... | B60L 1/00 |
| | | | | 320/167 |
| 2014/0091764 A1 | 4/2014 | Kinomura et al. | | |
| 2014/0132226 A1 | 5/2014 | Sakamoto et al. | | |
| 2014/0297074 A1* | 10/2014 | Lee | .................... | B60L 15/2063 |
| | | | | 701/22 |
| 2014/0300318 A1* | 10/2014 | Sonoda | ................ | B60L 3/0038 |
| | | | | 320/109 |
| 2015/0077063 A1* | 3/2015 | Tsukamoto | ............ | B60L 53/65 |
| | | | | 320/134 |
| 2016/0152153 A1* | 6/2016 | Yang | ........................ | B60L 1/02 |
| | | | | 320/109 |
| 2016/0164328 A1* | 6/2016 | Kim | ......................... | H02J 7/00 |
| | | | | 320/112 |
| 2018/0186244 A1 | 7/2018 | Harvey et al. | | |
| 2020/0009967 A1 | 1/2020 | Stevens et al. | | |
| 2022/0097549 A1 | 3/2022 | Oishi et al. | | |
| 2023/0106645 A1* | 4/2023 | Tachibana | ............... | B60L 58/12 |
| | | | | 320/109 |
| 2023/0211686 A1* | 7/2023 | Smolenaers | ........... | B60L 53/53 |
| | | | | 320/109 |
| 2023/0299608 A1* | 9/2023 | Huang | ................... | H02M 1/36 |
| | | | | 320/137 |

* cited by examiner

DOCKED INTERLOCK SYSTEM AND METHOD

CROSS-REFERENCE TO RELATED APPLICATIONS

This application claims priority to U.S. Provisional Application No. 63/352,052, filed Jun. 14, 2022, entitled "DOCKED INTERLOCK SYSTEM AND METHOD," the disclosure of which is incorporated by reference in its entirety for all purposes.

BACKGROUND

In certain entertainment settings, such as in an amusement park, certain entertainment setting features may be completely or partially battery-operated (e.g., electric or hybrid). For example, in an amusement park setting, a ride feature or a show feature may be battery-operated, such that the ride feature and show feature may be charged. Often, for charging, the electric feature may be charged at a charging station or a charging dock. In particular, a user for the electric feature may connect a charging cable of the charging station into a charging port of the electric feature. However, while the electric feature is charging, the user may be able to move or drive the feature. That is, the user may manually monitor and move the electric feature. However, monitoring the charging port status of the electric feature, for example, along with monitoring other electric feature-related statuses, may be difficult.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a charge interlock system of an electronic device includes a drive system, a relay coupled to the drive system, and a controller. The controller receives an indication that the electric device is in a charging mode. The controller also transmits signals to open the relay. Moreover, the controller determines that the drive system is disabled based at least in part on the open relay.

In an embodiment, a method includes determining that an electric feature is charging. Additionally, the method includes, in response to a determination that the electric feature is charging, disabling a drive system of the electric feature using a relay to disconnect or connect the drive system.

In an embodiment, a relay of an electric vehicle disables a drive system by opening a switch connecting to the drive system, in response to an indication that the electric vehicle is in a charging mode. Moreover, in response to an indication that the electric vehicle is in a non-charging mode, the relay enables the drive system by closing the switch.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
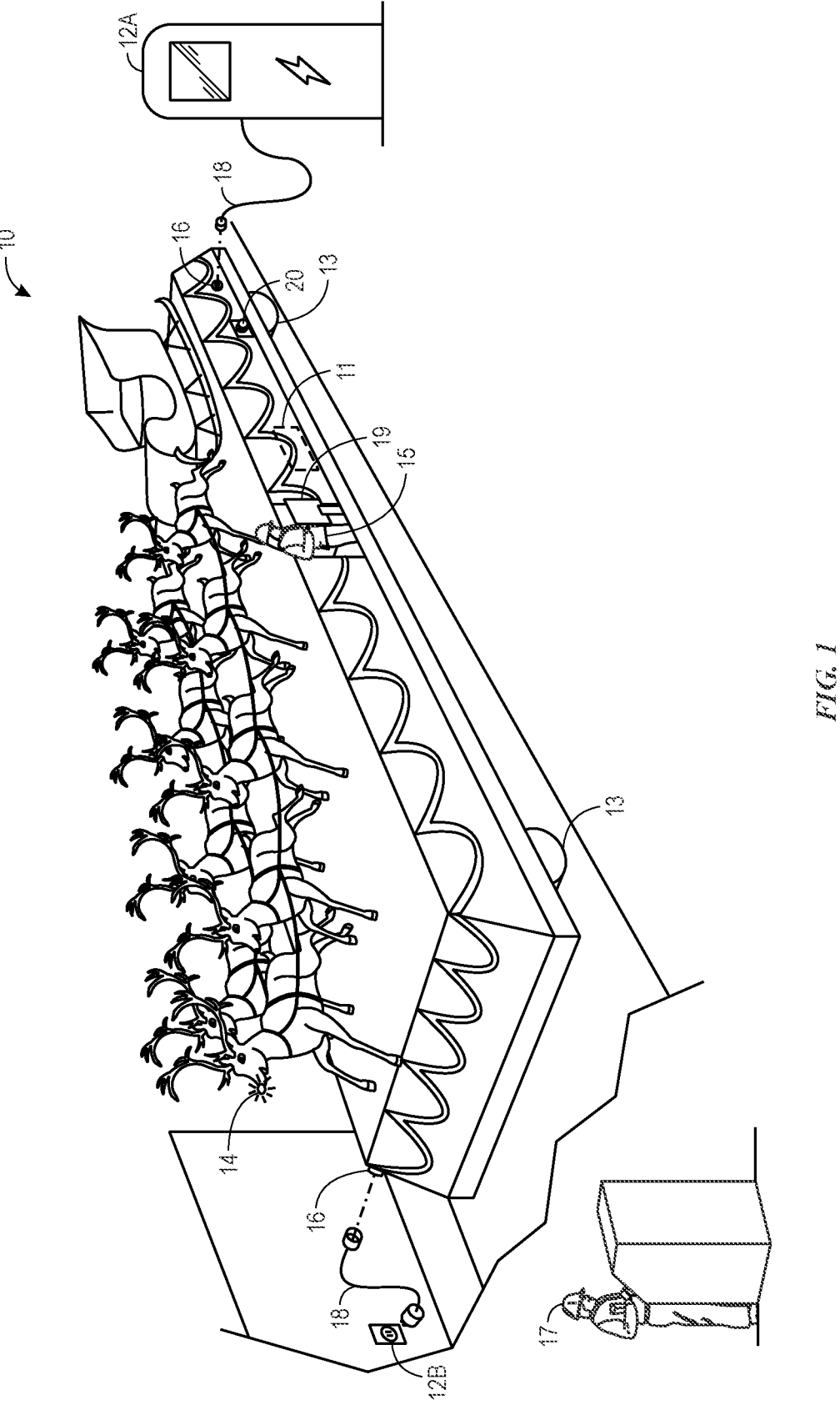
FIG. 1 is a schematic perspective view of an amusement park electric feature powered by a battery, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). As used herein, the term "charging" or "charging an electric feature" refers to the charging of a battery that powers certain portions of the electric feature. Also, as used herein, the term "docked" refers to the electric feature connected to a charging station via a charging cable. That is, the electric feature may be docked while it is charging and still be docked after charging is complete.

The present disclosure relates generally to the field of amusement parks. Specifically, embodiments of the present disclosure relate to techniques for ensuring that amusement park objects are handled as expected, especially for docked objects, to prevent or reduce damage that may otherwise occur due to using the docked object in an unexpected manner.

Entertainment settings may often require users to follow protocols or procedures for handling objects to avoid unexpected consequences. By way of example, an electric feature, such as a ride feature or a show feature, in an amusement park setting may include one or more batteries for powering the electric feature. As previously discussed, the battery of the electric feature may be charged at a charging station or a charging dock at the amusement park. To charge the electric feature, a user may plug a charging cable of the charging station into a charging port of the electric feature. By way of example, the user may attempt to move the electric feature while the electric feature is docked (e.g., connected to a charging station via a charging cable for charging a battery that powers the electric feature). Moving the electric feature while the electric feature is charging may cause the electric feature, the charging station, or both, to operate in an unexpected manner (e.g., caused by damage to the electric feature). For example, moving the electric feature while the electric feature is charging may cause the cable plugged into the charging port of the electric feature to become damaged. Thus, managing the electric feature that is docked may be difficult. As such, it is now recognized that improved systems are desirable to limit complexities and monitoring of charging station systems.

It should be noted that although examples provided herein may be specifically directed to particular electrical features of an amusement park, such as charging batteries that provide power to the electric features, the techniques in this disclosure may be applied to other conditions and/or contexts. Thus, the present examples should be understood to reflect real-world examples of the amusement park to provide useful context for the discussion, and should not be viewed as limiting further applicability of the present approach. For example, the present disclosure should be understood as being applicable to additional or alternative situations in which monitoring a docked feature (e.g., not electric), a battery-operated object, objects generally connected to cables or cords, or any combination thereof, may be utilized, such as for electric vehicles, electrical home and commercial devices, and so forth.

With the foregoing in mind, FIG. 1 is a schematic perspective view of an electric feature 10 (e.g., an electric vehicle, and electric device, and the like) of an amusement park float that may utilize a charge station interlock system discussed herein. By way of example, the charge station interlock system may be used to automatically lock, stop, or prevent movement of the electric feature 10, for example, while it is docked at a charging station, as well as to automatically release the automatic lock. Although the following discussions describe the electric feature 10 as an electric float of an amusement park float show that is completely battery-operated and charged using one or more charging stations, the electric feature 10 may be any partially or completely battery-operated device with one or more charging ports. Moreover, the electric feature 10 may be any feature in an amusement park that may require power, such as a battery-operated (e.g., electric) ride vehicle that moves along a roller coaster, a battery-operated ride, a battery-operated show feature, a battery-operated character that moves its extremities to interact with guests at the amusement park, and so forth. As previously mentioned, the electric feature 10 may also be used in a non-amusement park related context, such as an electric vehicle, a battery-operated vacuum cleaner, a battery-operated lawn mower, and so forth.

As shown, the electric feature 10 may include one or more batteries 11. As previously mentioned, the electric feature 10 may be completely battery-operated, such that the electric feature 10 is powered exclusively by energy stored on the battery 11. In additional or alternative embodiments, the electric feature 10 may be a hybrid feature, such that the electric feature 10 is powered by a combination of electricity (e.g., charging the battery 11) and fuel. In such embodiments, the engine used for driving the electric feature 10 may be powered by fuel and other features of the electric feature 10 may be powered by the battery 11. For either type, the electric feature 10 may utilize the battery 11 to power the electric feature 10 for at least some operations. For example, the battery 11 may power the electric feature 10 to rotate tires 13 and drive as part of its routine operations.

In the depicted embodiment, the electric feature 10 is a float for a float parade. As such, the float may include objects pertaining to a theme for the float parade. Here, the electric feature depicts reindeer and a sleigh as part of a holiday theme for the float parade. The reindeer and sleigh may also be completely or partially battery-operated. For example, at least one of the reindeer may have a light feature 14. The light feature 14 may also be powered by the battery 11. As such, the electric feature 10 may include one or more features that are at least partially battery-operated. The battery 11 may be one or more lithium-ion batteries, nickel-metal hybrid batteries, lead-acid batteries, ultracapacitors, and the like.

To charge the battery 11, the electric feature 10 may connect to one or more charge stations, such as a first charge station 12A, a second charge station 12B, or both. The first charge station 12A may be a direct current (DC) charger, and the second charge station 12B may be an alternating current (AC) charger. The DC charger of the first charge station 12A may include a convertor within the DC charger itself so that the first charge station 12A may provide current directly to the battery 11 so that the electric feature 10 does not have to include a convertor. In contrast, the AC charger of the second charge station 12B is an onboard charger in which the AC charger provides current to the battery 11 of the electric feature 10. The electric feature 10 may include a convertor to convert the AC current to a DC current, which is subsequently provided to the battery 11 for charging. Generally, the second charge station 12B may include a wall socket (e.g., of a residential or commercial building). Both the first charge station 12A and the second charge station 12B may plug into one or more charge ports 16 of the electric feature 10.

In some embodiments, a user 15 may operate the electric feature 10. The user 15 may include a human driver, a robotic driver, and/or autonomous driving without a human driver. The user 15 may drive the electric feature 10 to maneuver it around or drive during the float parade, such as via tires 13. In some embodiments, the tires 13 may rotate to move the electric feature 10 via power from the battery 11. The user 15 may also drive the electric feature 10 to and from the charge station 12 (e.g., via the rotating tires 13 powered by the battery 11). In particular, the user 15 may plug in a charging cable 18 of the charging station 12 into a charge port 16 of the electric feature 10. In additional or alternative embodiments, a feature operator 17 may monitor the electric feature 10. In particular, the feature operator 17 may manually verify that the electric feature 10, the user 15, or both are in compliance with procedures for the electric feature 10. However, relying on the feature operator 17 for compliance may result in long delays caused by the feature operator 17 resolving for compliance issues before resuming a paused electric feature 10.

Additionally or alternatively to the feature operator 17, the user 15 may monitor the charging status of the electric feature 10 when the electric feature 10 is docked. For example, after plugging in a charge cable 18 that directs current from the charging stations 12 through one or more charge ports 16 of the electric feature 10 to ultimately charge the battery 11 for powering the electric feature 10, the user 15 may determine the charging status of the electric feature 10. For example, the electric feature 10 may include a dashboard 19 that indicates a status of charging when the charging cable 18 is plugged into the charge port 16 and the battery level is increasing. The dashboard 19 may also indicate other charge-related statuses, for example, the percentage of battery charge (e.g., 20%, 50%, and so forth), battery status (e.g., low battery), nearby charge stations 12 at the amusement park, and so forth. Similarly, the dashboard 19 may indicate a status of charge complete upon the battery 11 being completely charged. In some embodiments, as will be discussed with respect to FIGS. 3 and 4, a battery 11 that is completely charged may facilitate re-enabling a disabled drive system.

In some embodiments, the electric feature 10 may also include a vehicle stop button 20. The vehicle stop button 20 may disable a drive system. In some embodiments, and additionally or alternatively to disabling the drive system, the vehicle stop button 20 may enable an emergency brake system of the electric feature 10 (e.g., different than the drive system) to prevent the electric feature 10 from driving. In such embodiments, the vehicle stop button 20 may include an electronically controlled parking brake, a mechanically controlled brake, or both. Although the descriptions discussed herein describe both disabling the drive system, enabling the emergency brake system, or both, the systems and methods described herein may utilize only disabling the drive system, such as via opening a relay that enables the drive system (e.g., disconnecting the drive system). In particular, the drive system may be disconnected from a power source (e.g., the battery 11, another power source, or both) that powers the drive system. Disconnecting the drive system from the power source may disable the electric feature 10 from driving while connecting the drive system to the power source may enable the electric feature 10 for driving.

A user 15 inside the electric feature 10 that is driving the electric feature 10 or a user 15 positioned outside the electric feature 10, may press the vehicle stop button 20 or a similar mechanism for disabling the drive system or enabling emergency brakes. In some embodiments, the feature operator 17 may press the vehicle stop button 20 for disabling the drive system or enabling emergency brakes. Disabling the drive system or enabling the brakes may prevent the electric feature 10 from moving, such as by pausing a driving mode of the electric feature 10 or the like. In particular, the vehicle stop button 20 may be used by the user 15 or the feature operator 17 to prevent the electric feature 10 from moving in an unexpected manner, such as during an unexpected time frame (e.g., while docked).

Figure 2:
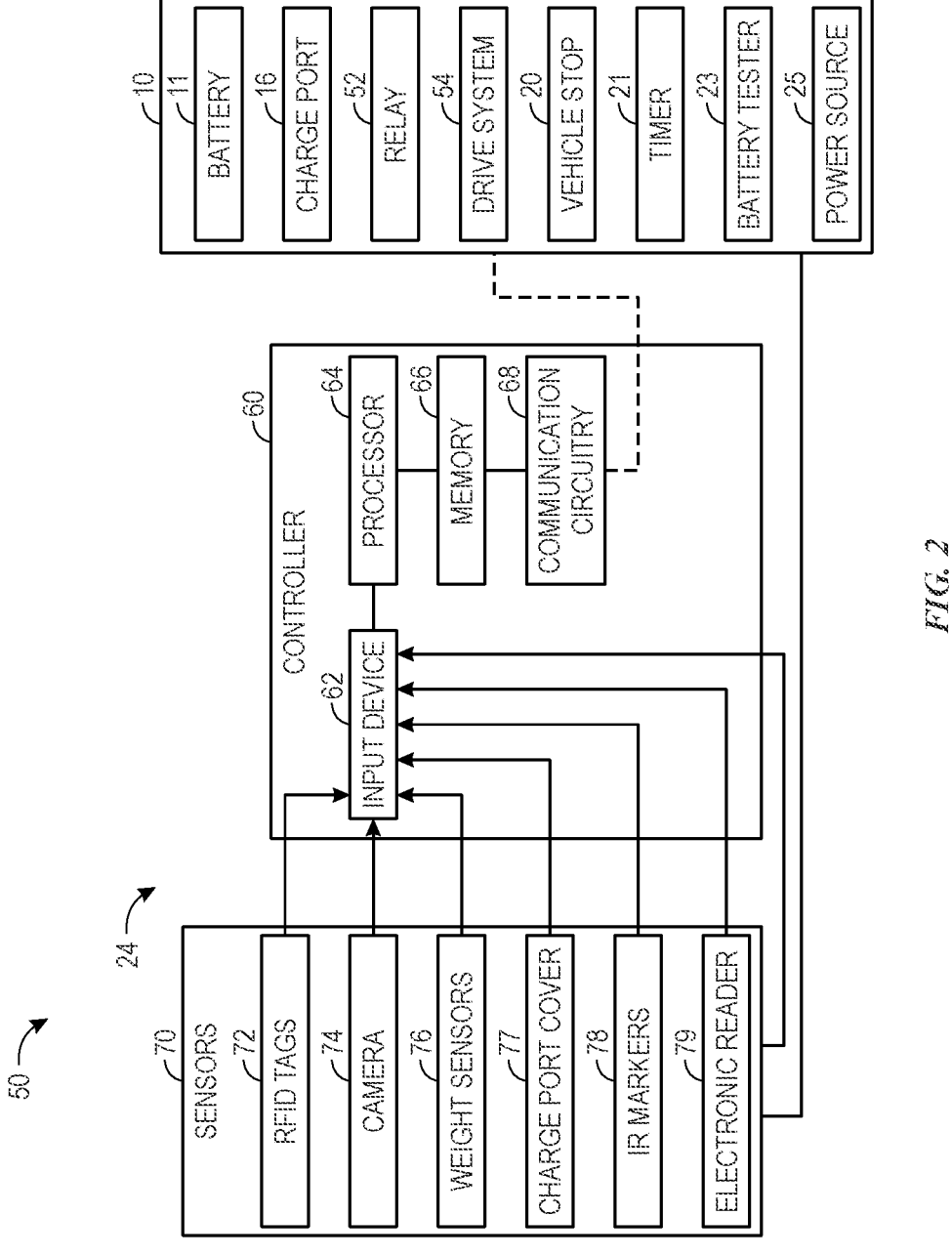
FIG. 2 is a schematic diagram of a charge station interlock system applied to the electric feature of FIG. 1, in accordance with an embodiment of the present disclosure.

FIG. 2 is a schematic diagram of a charge station interlock system 50 applied to the electric feature 10 (e.g., electric ride feature) of FIG. 1. As shown, the charge station interlock system 50 includes the electric feature 10, a controller 60, and sensors 70. As will be described herein, the charge station interlock system 50 may efficiently monitor and automatically prevent or stop the electric feature 10 from driving (e.g., by disabling a drive system, enabling an automatic braking system, or both). Although the systems and methods described herein describe various sensors 70 used in conjunction with the charge port 16 for determining presence of the electric feature 10, which represents a particular embodiment, the systems and methods described herein may use only the charge port 16 to monitor the electric feature 10 and subsequently prevent the electric feature 10 from moving during an expected time frame (e.g., while docked). It should be understood that the illustrated system is merely intended to be exemplary, and that certain features and components may be omitted and various other features and components may be added to facilitate performance, in accordance with the disclosed embodiments.

The electric feature 10 may include the battery 11, the charge port 16, a relay 52 (e.g., a switch), a drive system 54, the vehicle stop button 20, a timer 21, a battery tester 23, and a power source 25. As previously discussed, the charge station 12 may connect to the electric feature 10 via a charging cable 18 that connects from the charge station 12 to the charge port 16 of the electric feature 10. The charge station 12 may charge the battery 11 of the electric feature 10 to power the electric feature 10, such as for driving the electric feature 10, powering other features of the electric feature 10, or both. In particular, a user 15 may drive the electric feature 10 to the charge station 12. The user 15 may dock the electric feature 10 at the charge station. In particular, the user 15 may dock the electric feature 10 within a predetermined distance threshold from the charge station 12 so that the charging cable 18 may reach the charge port 16 of the electric feature 10 from the charge station 12. However, the electric feature 10 may be moved from the dock of the charging station 12. For example, the electric feature 10 may be capable of driving while docked In some instances, the electric feature 10 may be moved away from the charging station 12 while the charging cable 18 is plugged into the charging port 16 of the electric feature 10. As such, by moving the electric feature 10 while it is still connected to the charge station 12 (e.g., docked), the electric feature 10 may be handled in an unexpected manner. To prevent unexpected consequences to the charge station 12, the electric feature 10, or both, the charge station interlock system 50 may interlock the drive system 54 of the electric feature 10 using the relay 52. That is, the interlock system 50 may disable the drive system 54, enable a brake system, or both.

In particular, the relay 52 may be a switch for interlocking the drive system 54. Upon the electric feature 10 being docked at the charge station 12, such that the electric feature 10 is connected to the charge station 12 via the charging cable 18, the relay 52 may open (e.g., open state of switch). In particular, and as will be discussed with respect to FIG. 3, the relay 52 may utilize the emergency stopping system of the vehicle stop button 20 to disable the drive system 54 from the power source 25, enable emergency brakes to counter the drive system 54, or both. That is, the vehicle stop button 20 may be associated with a system often used for emergencies and enabled via the vehicle stop button 20 to prevent the electric feature 10 from operating in an unexpected manner. Specifically, when the charge port 16 is in use, such that the charge station 12 is connected to the electric feature 10 via the charging cable 18, the relay 52 may open (e.g., disconnected state of switch) to disconnect the drive system 54 from the power source 25 to prevent driving of the electric feature 10. The power source 25 may include any source that provides energy or power to the drive system 54. The power source 25 may include one or more batteries, electrical power sources, gasoline, biodiesel, natural gas, and the like. In some embodiments, the power source 25 may be the battery 11. Disconnecting the drive system 54 using the relay 52 may include uncoupling the drive system 54 from the power source 25 so that the drive system 54 is no longer activated. When the charge port 16 is not in use (e.g., the charging cable 18 has been placed back at the charge station 12), the relay 52 may close (e.g., closed state) and reconnect the drive system 54. The drive system 54 may enable driving or moving the electric feature 10. In this manner, the relay 52 may enable the drive system 54 when the charge port 16 is not in use and disable the drive system 54 when the charge port 16 is in use while the electric feature 10 is charging. Moreover, as previously mentioned, the relay 52 may similarly connect emergency brakes to disable driving or disconnect the emergency brakes to enable driving.

In additional or alternative embodiments, the sensors 70 may communicate with (as shown) or be integrated with the electric feature 10, the controller 60, or both. For example, a charge port cover sensor 77 may be integrated with the electric feature 10 (e.g., coupled to or disposed at the charge port 16 of the electric feature 10). The sensors 70 may additionally or alternatively indicate that the charge port 16 is in use or will likely be in use, such that the relay 52 may open to disable the drive system 54 to stop or reduce unexpected consequences. Sensor data from the sensors 70 may be used in conjunction with other data (e.g., timing data from the timer 21, a battery level data from the battery tester 23, and so forth) to indicate that the electric feature 10 is charging, finished charging, and so forth. In particular, the sensors 70 may include one or more of radio frequency identification (RFID) tags 72, cameras 74, weight sensors 76, charge port cover sensor 77, infrared (IR) markers 78, and/or electronic readers 79. In some embodiments, the sensors 70 may be placed or positioned in areas where the electric feature 10 is expected to be docked in a docking area, such as within a threshold distance or a predetermined distance (e.g., to provide sufficient slack for the charging cable 18, such as under approximately 1.5 meters (m) from the charge station 12). Moreover, in some embodiments, the electric feature may form a near-field communication connection with one or more of the sensors 70, the charge station 12, or both. That is, the charge station 12 may be equipped with devices (e.g., Bluetooth devices) that enable the near-field communication. The near-field communication may include wireless communication protocols that enable communication between electronic devices over a short distance, such as between 4 centimeters (cm) and 10 cm. The near-field communication may be indicative of the electric feature 10 being in a charging mode (e.g., docked and charging). Docking within the predetermined distance may also indicate that the battery 11 will likely be charged or that it is in a charging mode, for example, based on the near-field communication. The sensors 70 may provide other data indicating that the electric feature is expected to be docked in a docking area, such as based on exceeding a predetermined weight at the docking area, image data indicating the electric feature 10 is near the charge station 12, and so forth. The sensor data from the sensors 70 may indicate that the electric feature 10 is positioned at the dock, and thus, may indicate that the relay 52 may benefit from opening to reduce or prevent unexpected consequences to the electric feature 10, the charge station 12, or both. Specifically, the electric feature 10 may open the relay 52 to disable the drive system 54 based on the sensor data indicating that the electric feature 10 is below a threshold distance from the charging station 12 and before a predetermined time period has passed.

The timer 21 may include a clock that measures time in seconds, minutes, and so forth. The timer 21 may track time for the predetermined time period. The predetermined time period or predetermined time frame may correlate to a time frame to sufficiently charge the electric feature 10. As such, the predetermined time period may be indicative of the electric feature 10 being in the charging mode. The relay 52 may close after the predetermined time period has elapsed so that the drive system 54 may be re-enabled to drive the electric feature 10. The predetermined time period elapsing may indicate that charging the battery 11 has completed. Additionally or alternatively, a change in battery level determined and indicated by the battery tester 23, and as will be discussed with respect to FIG. 4, may indicate that charging the battery 11 has completed. The battery tester 23 may generally indicate a present charge level for the battery or percentage of battery charge (e.g., 20%, 50%, and so forth), a change in charging level, a battery status (e.g., low battery), and/or completion of charging.

Moreover, the controller 60 may include an input device 62, a processor 64, a memory 66, and communication circuitry 68. The input device 62 may receive input data from the sensors 70 and the electric feature 10 (e.g., the charge port 16). Based on the input data received at the input device 62, the controller 60 may adjust the relay 52 and by extension, the drive system 54, or adjust other features that may prevent or reduce unexpected consequences caused by unexpected use of the electric feature 10 while docked at the charge station 12.

The RFID tags 72 may communicate with the electronic readers 79 to indicate presence of an object, such as the electric feature 10 so that the charge station interlock system 50 may subsequently open or close the relay 52 to disable or enable the drive system 54, respectively. In particular, the RFID tags 72 may be incorporated on the electric feature 10 (e.g., inside, on the side, underneath, or on the entryway of the electric feature 10). Thus, the electronic readers 79 may be placed in a manner that allows scanning of the RFID tags 72. By way of example, electronic readers 79 may be placed on the dock so that the electronic readers 79 scan the RFID tags 72 on the electric feature 10 as the electric feature 10 passes over the electronic readers 79, indicating that the electric feature 10 is connected to the charging cable and thus, should be disabled from driving and/or moving. The electric feature 10 may be re-enabled for driving after the predetermined time frame has elapsed.

In some embodiments, the cameras 74 may be placed or positioned in areas based on where the electric feature 10 may be docked near the charging station 12, as previously discussed. The cameras 74 may determine the presence of the electric feature 10 based on images or video captured by the cameras 74. Additionally or alternatively, weight sensors 76 by the charging station 12 may indicate presence of the electric feature 10. In particular, the weight sensors 76 may be mounted on the dock or designated charging areas, and may indicate presence of the electric feature 10 based on measuring a weight exceeding a predetermined weight threshold (e.g., approximate weight corresponding to the electric feature 10). Moreover, the charge port cover sensor 77 may include a sensor that detects an open or a closed covering for the charge port 16, such as a door or a hatch that covers the charge port 16. The charge port cover sensor 77 may include contact sensors (e.g., with a switch and/or a magnet) and the like to detect the open or closed covering.

An open covering may indicate that the electric feature 10 is in the charging mode while a closed covering may indicate that the electric feature 10 is in a non-charging mode. The controller 60 may transmit a signal to open the relay 52 to disconnect the power source 25 from the drive system 54 to disable the electric feature 10 from driving, reducing or preventing unexpected consequences to the electric feature 10, the charge station 12, or both. Furthermore, IR markers 78 placed on the electric feature 10 may reflect light identified by the cameras 74 to indicate presence of the electric feature 10 at the dock.

The controller 60 may enable the communication circuitry 68 to interface with various electronic devices, such as a monitoring system, a service desk, and so forth, of the amusement park. The monitoring system and/or the service desk may communicate with the controller 60 to receive and/or send information to ensure that the charge station interlock system 50, the electric feature 10, or both, are operating as expected. Additionally, or alternatively, the controller 60 may enable the communication circuitry 68 to interface with components of the electric feature 10, such as the relay 52, the drive system 54 and/or the brake system associated with the vehicle stop button and so forth.

For example, the communication circuitry 68 may allow the controller 60 to communicatively couple to a network, such as a personal area network (PAN), a local area network (LAN), and/or a wide area network (WAN). Accordingly, in some embodiments, the controller may process data from the input device 62, determine presence of the electric feature 10 docked at the charging station 12, as well as communicate the modifications to the electric feature 10 (e.g., open or close relay 52) via the communication circuitry 68. For example, after processing data indicating that the charge port 16 is in use from the input device 62, the processor 64 may determine a control signal that enables the communication circuitry 68 to wirelessly transmit control data to the electric feature 10 to enable opening or closing the relay 52 (e.g., to stop the electric feature 10 by disconnecting the drive system 54). In other embodiments, the communication circuitry 68 may be connected via a wired connection to the electric feature 10.

The processor 64 may include one or more processing devices that receive input signals from the input device 62 relating to the docking of the electric feature 10 that may be used to determine possible modifications to the electric feature 10, using techniques described herein. The memory 66 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the processor 64 or by other processor-based devices. In particular, the processor 64 may include a processing core to execute machine-executable instruction algorithms stored in the memory 66. The processor 64 may also include processor-side interfaces for software applications running on the processing core to interact with hardware components on one or more electric feature 10 associated with the processor 64.

By way of example in the amusement park setting, the stored algorithms may include, but are not limited to, algorithms to determine presence of the electric feature 10 within the amusement park by a charge station 12 or docking of the electric feature 10 based on status of the charge port 16, sensor data from the sensors 70, timing data from the timer 21, and/or battery level data. The algorithms may also include algorithms to determine changes to the relay 52 based on the determination of the electric feature 10, algorithms to determine location of the electric feature 10 with respect to charge stations 12 within the amusement park, algorithms to determine current driving status of the electric feature 10, algorithms to determine charge port 16 use or charging status, and so forth.

Figure 3:
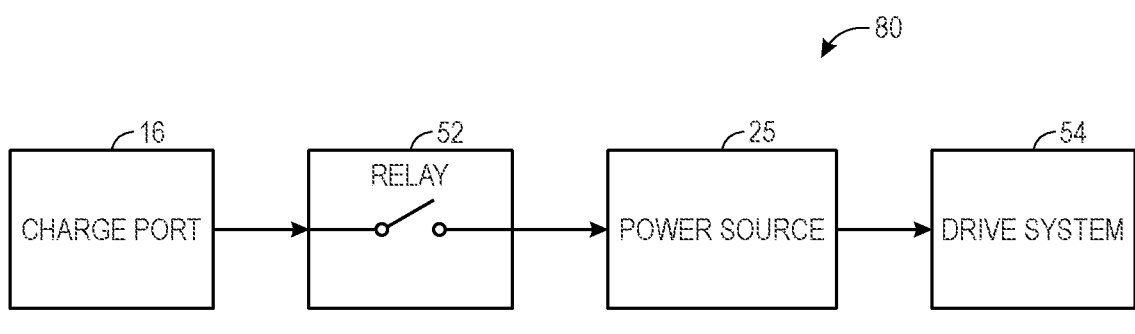
FIG. 3 is a schematic diagram of a relay of the charge station interlock system, in accordance with an embodiment of the present disclosure.

FIG. 3 is a flow diagram of a relay process 80 (e.g., a switch) of the charge station interlock system 50. As shown, the flow diagram of the relay process 80 may include the charge port 16, the relay 52, the power source 25, and the drive system 54. Although the relay process 80 describes the flow of data and conditions in a particular order, which represents a particular embodiment, the data and conditions may occur in any order. Moreover, and as previously mentioned, sensor data, timing data, and/or battery level data may be used to determine that the electric feature 10 is docked at the charge station 12 to open the relay 52 in addition to or as an alternative to an indication that the charge port 16 is in use. The indication that the charge port 16 is in use may be based on a message or signal received in the electric feature 10 (e.g., at the dashboard 19).

The charge port 16 may include a port of the electric feature 10 to use for charging the battery 11. The charge port 16 may be a point at which the charging cable 18 from a charging station 12 may plug into the electric feature 10. In some embodiments, the electric feature 10 may include only one port or may include multiple ports. By way of example, the various ports may be designated for different power speeds (e.g., fast charging using DC charging or relatively slow charging using AC charging), different connectors for the charging cable 18, and so forth. As previously discussed, when the electric feature 10 is plugged into the charge station 12, such that the electric feature 10 is docked at or near the charge station 12 (e.g., within a predetermined distance from the charging station 12 enabling sufficient slack for the charging cable 18 from the charge station 12 to the electric feature 10), the electric feature 10 may be disabled from moving. That is, while the charging cable 18 is plugged in, the electric feature 10 may be expected to be in a stationary position, such that the electric feature 10 may not move from the docked position to prevent unexpected consequences to the electric feature 10.

To prevent a user 15 (e.g., inside or outside of the electric feature 10) from moving the electric feature 10 (e.g., inadvertently driving the electric feature 10), the system and methods described herein may utilize the relay 52 to utilize an existing disabling drive system associated with the vehicle stop button 20 that disables the drive system 54. In some embodiments, the relay 52 may utilize an existing braking system (e.g., different than disabling the drive system) associated with the vehicle stop button 20. The disabling drive system may be a primary (e.g., main) system and the brake system may be a secondary (e.g., backup) system, to stop or prevent the electric feature 10 from moving. For example, the vehicle stop button 20 may be used when the user 15 notices the electric feature 10 continuing to drive or move forward while instructed to be in a parked or stationary state. That is, the user 15 may use the vehicle stop button 20 to prevent or stop the electric feature 10 from operating in an unexpected manner. As such, the relay process described herein may use the relay 52 associated with the vehicle stop button 20 to provide a similar automatic brake to stop or prevent the electric feature 10 from moving when the electric feature 10 is docked. In particular, and as previously discussed, the charging state may be determined based on the charge port 16 in use, as discussed with respect to FIG. 2 and FIG. 3. Additionally or alternatively, the charging state may be determined based on sensor data, timing data, and/or battery level data, where the sensor data indicates that the electric feature 10 is presently docked at the charge station 12 or is likely docked at the charge station 12. Moreover, since the systems and methods described herein utilize an existing disabling drive system and/or enabling a braking system, the systems and methods may not include additional components and circuitry to implement a process for stopping the electric feature 10 from operating in an unexpected manner. Thus, the systems and methods described herein may efficiently provide the relay process 80 while conserving space otherwise associated with additional components and circuitry to implement the stopping process.

When the electric feature 10 is docked, such as based on an indication that the charge port 16 is in use, the relay 52 may automatically open. In some embodiments, the relay 52 may enable or disable the drive system 54. Specifically, when the relay 52 is closed (e.g., connected or turned on), the drive system 54 is coupled to components (e.g., electrical and/or mechanical components, power source 25, and so forth) that enable driving or moving the electric feature 10. On the other hand, when the relay 52 is open (e.g., disconnected or turned off), the drive system 54 is uncoupled from the components that enable driving the electric feature. By way of example, and as shown, the open relay 52 may disconnect the power source 25 from the drive system 54 to disable the electric feature 10 from driving. On the other hand, the closed relay 52 may connect the power source 25 to the drive system 54 so that the electrical feature 10 may drive. Thus, by opening the relay 52, the circuitry and power enabling the drive system 54 may be disconnected to disable the drive system 54. In this manner, the relay process 80 provides an automatic or default system to disable the electric feature 10 from driving, and thus, preventing or stopping the electric feature 10 from operating in an unexpected manner that may result in unexpected consequences. For example, the unexpected consequences may result in damage to the charge port 16, the battery 11, and so forth, of the electric feature 10, the charging cable 18, the charging station 12, structures attached to or connected to the charging station 12 (e.g., a building for mounting the charging station 12) and so forth.

Figure 4:
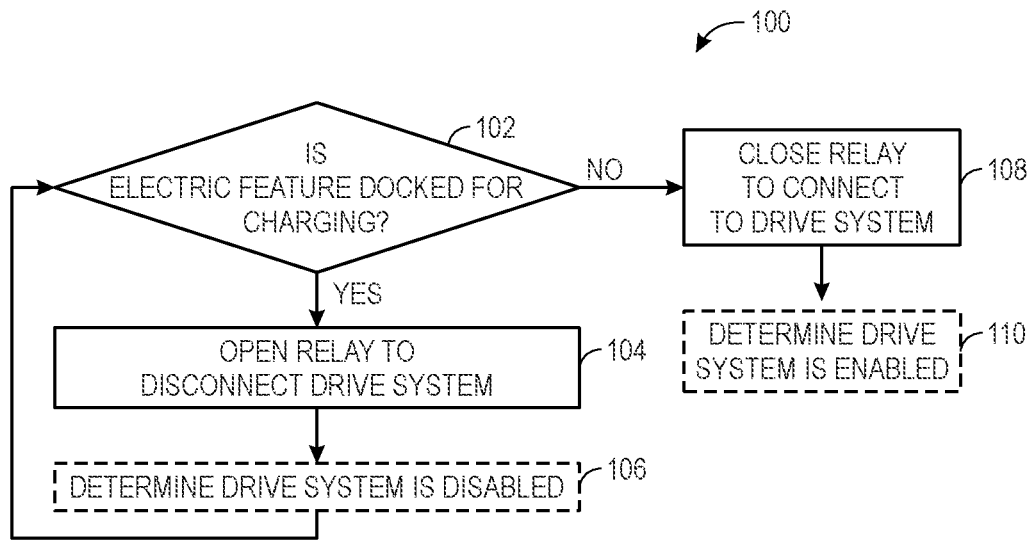
FIG. 4 is a process flow diagram of a method for interlocking the electric feature, in accordance with an embodiment of the present disclosure.

FIG. 4 is a process flow diagram of a method 100 for interlocking the electric feature in accordance with an embodiment of the present disclosure. While the method 100 is described using acts in a specific sequence, it should be understood that the described acts may be performed in different sequences than the sequence illustrated, and certain described acts may be skipped or not performed altogether. In general, at least some of the steps of the method 100 may be implemented at least in part by the charge station interlock system 50 of FIG. 2. Specifically, these steps may be implemented at least in part by the controller 60 and/or the processor 64 of the controller 60 that executes instructions stored in a tangible, non-transitory, computer-readable medium, such as the memory 66. In alternative or additional embodiments, at least some steps of the method 100 may be implemented by any other suitable components or control logic, and the like.

When interlocking the electric feature 10, the processor 64 may determine whether (decision block 102), the electric feature 10 is docked. For example, the processor 64 may determine that the electric feature 10 is docked based at least on a determination that a charge port 16 is in use. In particular, the charge port 16 may be in use when a charging cable 18 is plugged into the charge port 16 to charge the battery 11. In additional or alternative embodiments, and as previously mentioned, the processor 64 may determine that the electric feature 10 is docked based on sensor data, timing data, and/or battery level data discussed with respect to FIG. 2. The data may indicate the electric feature 10 is docked or likely docked at the charging station 12, as well as indicate status of charging and when charging may be completed. In particular, the charge port usage data, sensor data, timing data, and/or battery level data may indicate that the electric feature is in a charging mode when charging and a non-charging mode when the charging has completed. By way of example, the data may indicate that the electric feature 10 is parked and within a predetermined distance or within a threshold distance from a charge station 12 (e.g., less than 1.5 m). As such, the data indicates that the electric feature 10 is likely docked. In some instances, the sensor data may be based on weight above a predetermined weight threshold (e.g., at the docking area) measured by a weight sensor 76, image data from a camera 74 indicating that the electric feature 10 is parked at the charging station 12, and so forth.

Moreover, sensor data indicating that the electric feature 10 is parked and within a predetermined distance or within a threshold distance from a charge station 12, along with elapse of a predetermined time period indicated by the timing data and/or a change in battery level data, may indicate that the electric feature 10 has completed charging and that the drive system 54 should be re-enabled. For example, the battery level data may indicate a change in battery level, such as by a threshold level of charge change (e.g., 1%, 5%, 10%, and so forth), reaching a threshold battery level (e.g., 50%) when the battery level was initially below the threshold battery level, and/or reaching a complete battery charge (e.g., 100% charged). By way of another example, the relay 52 may close after the battery level is stable and the time period has elapsed so that the drive system 54 may be re-enabled for driving the electric feature 10. Generally, the relay 52 may close after determining that the electric feature 10 should no longer be docked, such as by the change in battery level, timing for charging, and so forth.

After determining that the electric feature 10 is docked, the processor 64 may open (process block 104) the relay 52, as discussed with respect to FIG. 3. Specifically, the processor 64 may transmit a signal that causes the relay 52 to open in order to disconnect the drive system 54 from the power source 25 that powers the drive system 54 (e.g., disabling the drive system 54). Disconnecting from the drive system 54 may stop or prevent the electric feature 10 from moving to reduce unexpected consequences otherwise associated with the electric feature 10 operating in an unexpected manner (e.g., driving while charging). The processor 64 may optionally (as indicated by the dashed line box) determine (process block 106) that the drive system 54 is disabled or disconnected after the processor 64 instructs the relay 52 to open, uncoupling from the drive system 54. As previously discussed, the electric feature 10 may also utilize an emergency braking system other than the vehicle stop button 20, which may disable the drive system 54. The processor 64 may automatically recheck whether the electric feature 10 is still docked. For example, the processor 64 may check after a change in charge port 16 usage, sensor data, elapsed time frame data, and/or battery level data. In some embodiments, the processor 64 may periodically recheck whether the electric feature 10 is still docked. For example, the time frame for rechecking may be based on an average time frame to charge the battery 11 from the current charge level to a complete charge.

On the other hand, if the electric feature 10 is not docked or has finished charging, such as based on the charge port 16 usage, sensor data, elapsed time period, battery level data, and/or a status of the charging station 12 (e.g., indicating charge is complete), the processor 64 may transmit a signal that causes the relay 52 to close (process block 108), connecting the drive system 54 to the power source 25 (e.g., enabling the drive system 54). That is, the processor 64 may enable the drive system 54 to operate or continue to operate, such that disabling the drive system 54 is not implemented. The processor 64 may optionally (as indicated by the dashed line box) determine (process block 110) that the drive system is enabled (e.g., re-enabled). In some embodiments, closing the relay 52 may also release the automatic emergency braking system (e.g., that is not the drive system 54). In some embodiments, the drive system 54 may also include a manual braking system. As such, the drive system 54 may be activated and the electric feature 10 may be driven, but a user may manually utilize the manual braking system of the drive system 54 to stop or prevent the electric feature 10 from driving, if desired. In some embodiments, this braking system may not be associated with the vehicle stop button 20 or the relay 52.

As such, the systems and methods described herein facilitate efficiently stopping or preventing an electric feature 10 from driving or moving while charging. Moreover, the systems and methods may utilize an emergency disabling drive system, braking system, or both, of the electric feature. Utilizing an existing system may efficiently provide the disabling process when the electric feature 10 is charging without adding new circuitry, conserving space in the electric feature 10.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A charge interlock system of an electric device, the charge interlock system comprising:
  a drive system;
  a relay configured to control an electrical circuit of the drive system and a braking system associated with a brake of the electric device; and
  a controller configured to:
    receive an indication that the electric device is in a charging mode;

transmit a signal configured to cause the relay to open in response to receiving the indication that the electric device is in the charging mode, wherein opening the relay disables the drive system and activates the brake; and
    determine that the drive system is disabled and the brake is activated based at least in part on the open relay.

2. The charge interlock system of claim 1, wherein the relay, in an open configuration, disconnects the drive system from a battery of the electric device, the battery being operable to power the drive system when connected to the drive system.

3. The charge interlock system of claim 1, wherein the indication is based at least in part on usage of a charge port of the electric device.

4. The charge interlock system of claim 1, wherein the indication is based at least in part on sensor data indicating that the electric device is within a predetermined threshold distance from a charging station and based at least in part on a predetermined time frame indicative of the electric device being in the charging mode.

5. The charge interlock system of claim 1, wherein the indication is based at least in part on sensor data indicating that the electric device exceeds a predetermined weight threshold at a docking area of a charging station.

6. The charge interlock system of claim 1, wherein the controller is configured to transmit an additional signal to close the relay or maintain the relay in a closed configuration in response to the electric device being outside a predetermined threshold distance from a charging station and based on a predetermined time frame indicative of the electric device being in the charging mode.

7. The charge interlock system of claim 1, wherein the controller is configured to periodically determine that the electric device is in the charging mode based on usage data of at least a charge port, sensor data, elapsed time frame data, or battery level data.

8. A method, comprising:
  determining that an electric feature is charging; and
  in response to the determination that the electric feature is charging, causing a relay disposed along an electrical circuit connecting a drive system of the electric feature to a power source of the electric feature to open, wherein causing the relay to open disconnects the drive system and connects a braking system to disable movement of the electric feature.

9. The method of claim 8, comprising:
  determining that the electric feature is not charging; and
  in response to determining that the electric feature is not charging, enabling the drive system of the electric feature using the relay.

10. The method of claim 8, wherein the relay in a closed state enables the drive system for driving.

11. The method of claim 8, wherein the relay in an open state disables the drive system for driving.

12. The method of claim 8, wherein the relay is associated with the braking system for connecting and disconnecting the drive system to the power source of the electric feature.

13. The method of claim 8, wherein the electric feature comprises a float, a ride, a vehicle, a show feature, or any combination thereof, at an amusement park.

14. The method of claim 8, comprising:
  receiving an indication that the electric feature is charging, the indication based at least in part on a near-field communication.

15. The method of claim 8, wherein determining that the electric feature is charging comprises determining that a charging cable is plugged into a charge port of the electric feature.

16. A relay of an electric vehicle, the relay configured to:
in response to an indication that the electric vehicle is in a charging mode, opening a switch along a circuit including a drive system of the electric vehicle, causing the drive system to be disabled and a braking system of the electric vehicle to be enabled; and
in response to an indication that the electric vehicle is in a non-charging mode, closing the switch, causing the drive system to be enabled and the braking system to be disabled.

17. The relay of claim 16, wherein the electric vehicle comprises a vehicle used for an amusement park ride, an amusement park show, or both.

18. The relay of claim 16, wherein the indication that the electric vehicle is in the charging mode is based at least in part on a usage of a charge port of the electric vehicle.

19. The relay of claim 16, wherein causing the drive system to be disabled comprises at least disconnecting a battery of the electric vehicle from the drive system.

20. The relay of claim 16, wherein the indication is based at least in part on sensor data indicating that the electric vehicle is within a predetermined threshold distance from a charging station.

* * * * *